(12) United States Patent
Lorenzen et al.

(10) Patent No.: US 11,630,897 B2
(45) Date of Patent: Apr. 18, 2023

(54) GOODS PROCESSING APPARATUS

(71) Applicant: Francotyp-Postalia GmbH, Berlin (DE)

(72) Inventors: Matthias Lorenzen, Berlin (DE); Kai Nicolai, Berlin (DE); Axel Ortmann, Berlin (DE); Tobias Reisinger, Oranienburg (DE); Robert Hoefig, Berlin (DE); Karsten von der Waydbrink, Potsdam (DE)

(73) Assignee: Francotyp-Postalia GmbH, Berlin (DE)

( * ) Notice: Subject to any disclaimer, the term of this patent is extended or adjusted under 35 U.S.C. 154(b) by 1020 days.

(21) Appl. No.: 16/402,625

(22) Filed: May 3, 2019

(65) Prior Publication Data

US 2019/0340356 A1  Nov. 7, 2019

(30) Foreign Application Priority Data

May 3, 2018 (DE) ..................... 20 2018 102 464.7
Jun. 26, 2018 (DE) ..................... 20 2018 103 618.1

(51) Int. Cl.
*G06F 21/56* (2013.01)
*G06F 3/16* (2006.01)
(Continued)

(52) U.S. Cl.
CPC ............ *G06F 21/566* (2013.01); *G06F 3/165* (2013.01); *G06F 3/167* (2013.01);
(Continued)

(58) Field of Classification Search
CPC ........ G06F 21/566; G06F 3/165; G06F 3/167; G06F 2221/034; G07B 17/00024;
(Continued)

(56) References Cited

U.S. PATENT DOCUMENTS 6,829,633 B2  12/2004  Gelfer et al.
10,593,328 B1 *  3/2020  Wang .................. H04L 65/1059
(Continued)

FOREIGN PATENT DOCUMENTS

DE  202007008565 U1  8/2007
EP       1146484 B1  2/2007

OTHER PUBLICATIONS

"Design and Implement of Franking Machine Control System Based on ARM" Published by IEEE (Year: 2008).*

*Primary Examiner* — Zeina Elchanti
(74) *Attorney, Agent, or Firm* — Banner & Witcoff Ltd.

(57) ABSTRACT

A goods processing apparatus includes a controller including a program memory, a security module, a first communication interface that is configured to, in cooperation with the security module, securely communicate with a remote server, and an acoustic output device electrically connected with the controller and configured to output audio files or sound files. The security module and the first communication interface can be electrically connected with the controller. The program memory may store a program to control the acoustic output via the acoustic output device. The program can facilitate external commands being transmitted from the remote server, or from one or more other internet sources, to the controller. Via security measures, operational security of the goods processing apparatus is prevented from being negatively affected, or harmful code is prevented from being transmitted to controller.

19 Claims, 5 Drawing Sheets

(51) Int. Cl.
*G07B 17/00* (2006.01)
*G10L 15/22* (2006.01)
*H03F 3/217* (2006.01)
*H04R 1/02* (2006.01)

(52) U.S. Cl.
CPC ... *G07B 17/0008* (2013.01); *G07B 17/00024* (2013.01); *G07B 17/00193* (2013.01); *G07B 17/00733* (2013.01); *G10L 15/22* (2013.01); *H03F 3/217* (2013.01); *H04R 1/025* (2013.01); *G06F 2221/034* (2013.01); *G07B 2017/00306* (2013.01); *G10L 2015/223* (2013.01); *H03F 2200/03* (2013.01); *H04R 2201/028* (2013.01)

(58) Field of Classification Search
CPC .......... G07B 17/0008; G07B 17/00193; G07B 17/00733; G07B 2017/00306; G10L 15/22; G10L 2015/223; H03F 3/217; H03F 2200/03; H04R 1/025; H04R 2201/028
USPC ....................................................... 381/122
See application file for complete search history.

(56) References Cited

U.S. PATENT DOCUMENTS 10,911,596 B1 * 2/2021 Do ..................... G10L 17/00
11,238,855 B1 * 2/2022 Goetz ................. G10L 13/00

* cited by examiner

GOODS PROCESSING APPARATUS

CROSS REFERENCE TO RELATED APPLICATIONS

This patent application claims priority to German Patent Application No. 202018102464.7, filed May 3, 2018, and German Patent Application No. 202018103618.1, filed Jun. 26, 2018, each of which is incorporated herein by reference in its entirety.

BACKGROUND

Field

The disclosure relates to a goods processing apparatus, such as, for example, smart franking machine.

Related Art

A PostBase®-type franking machine has an ink printing device comprising a printing module, a transport module for print media, and a contact pressure module for pressing the print media against the transport module. A modern touchscreen display already allows a manual input and optical output with one and the same device.

An end device (franking machine, scale, or PC) which has means in order to be able to process and reproduce sound files is known from European Patent 1.146.484 B1 (U.S. Pat. No. 6,829,633 B2). A server of a service center delivers compressed digital video and MP3 files via modem/Internet, which files are downloaded to a PC end device or to a franking machine and stored in flash memory. It is thereby possible to inform the operator about the latest function features of end devices, or of special offers from a manufacturer. However, the embodiment of a franking machine with the aforementioned function was not communicated in detail. Although known franking machines may process and store digital data, they conventionally do not have a loudspeaker in order to be able to reproduce audio or sound files, or have enough storage capacity to store audio or sound files. That is, they partially do not have enough storage capacity to store audio or sound files. Franking machines moreover emit an intense structure-borne noise that may represent a significant noise pollution.

A service device with auxiliary device connection is known from German Utility Model DE 20 2007 008 565 U1. The service device is a franking machine that has hardware means and a software means which are suitable to serially transfer compressed data loaded onto the service device further onto an external, non-volatile storage means, wherein an auxiliary device connection is provided that is adapted to the serial transfer of digital data. The auxiliary device is equipped for reproduction of audio files in the MP3 format.

An Internet-connected loudspeaker that transfers music wirelessly and integrates the functions of an intelligent personal assistant (IPA) via contactless speech control and speech recognition is already known from the Amazon Corporation, and is also referred to as a smart speaker. An interaction with a customer-specific capability is already known from the Internet:

https://developer.amazon.com/docs/ask-overviews/understanding-the-different-types-of-skills.html
https://developer.amazon.com/docs/custom-skills/understanding-custom-skills.html
https://developer.amazon.com/docs/ask-overviews/alexa-skills-kit-glossary.html
https://developer.amazon.com/docs/ask-overviews/understanding-how-users-interact-with-skills.html For example, the Amazon Corporation has developed a suitable infrastructure. Based on the preceding speech input, the Amazon Corporation's server sends messages to the recipient via the REST interface (HTTPS); see also https://en.wikipedia.org/wiki/Representational_state_transfer.

Devices such as smart speakers, such as the "Echo" from Amazon, and other devices with artificial intelligence, such as Alexa from Amazon and Google Assistant, may actually relieve us of simple tasks such as switching on lamps and operating music systems. It is known that the devices may sometimes react to false signal words because the microphones in the smart speakers are always active. Given a noise whose sound waves are similar enough to those of the activation command, the devices activate the virtual assistants, and therefore the data transfer to the servers of the vendor.

The uniqueness of a waveform depends on multiple factors, for example on the proximity of the speaker to the microphones, on the ambient noise, on the accent and volume of the user. Therefore, the manufacturers must establish a threshold for the uniqueness of the waveform, as of which they activate their assistants. If this threshold is too high, the device possibly only rarely reacts to the correct activation word, which might not be in the customer's interest. If the manufacturer therefore places the threshold low, however, it is then sufficient to generate a signal that is similar to that of the actual activation word. For example, Hue lamps from Philips can be networked via the Echo Plus and be controlled by app and voice. Given simple tasks, such as switching on lamps, the devices may sometimes react to false signal words, which can easily be corrected via additional speech inputs. However, given smart franking machines, incorrect inputs might have a fatal effect.

A Postbase100-type franking machine from the applicant Francotyp-Postalia GmbH includes a touchscreen and a piezoelectric sound transducer (e.g. beeper), but has no additional acoustic device for spoken communication with an operator of the franking machine.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

Figures 1A, 1B:
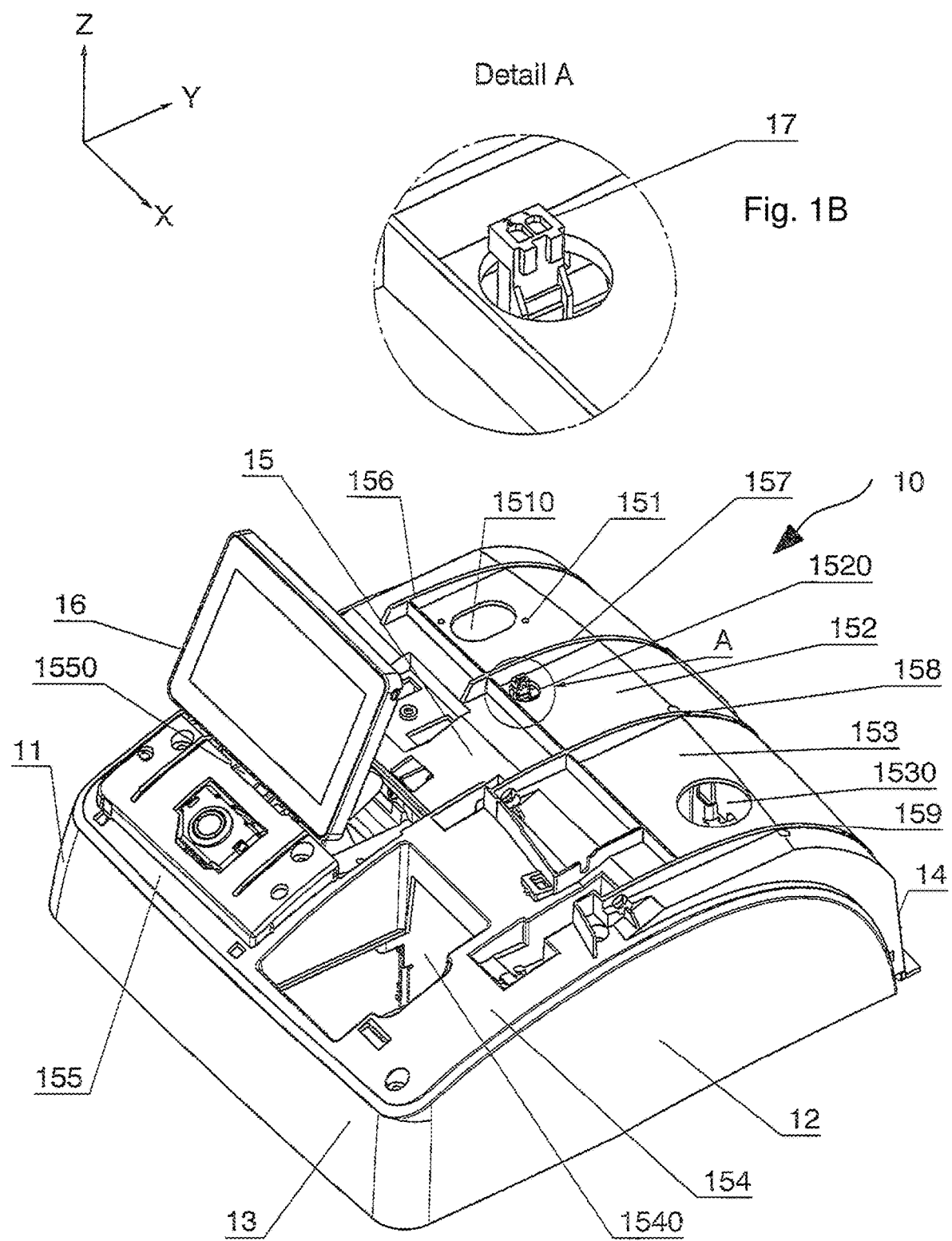
FIG. 1A is a perspective view of an upper housing shell from the upper right front according to an exemplary embodiment of the present disclosure.
FIG. 1B is an enlarged view of portion A as shown in FIG. 1A.

The exemplary embodiments of the present disclosure will be described with reference to the accompanying drawings. Elements, features and components that are identical, functionally identical and have the same effect are—insofar as is not stated otherwise—respectively provided with the same reference character.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure.

The goods processing apparatus has a controller that is connected with input and output device. The typical input and output devices are supplemented by acoustic input and/or output devices. The goods processing apparatus is a smart franking machine, for example. The smart franking machine is equipped with: a controller; an ink printing device to generate imprints on a print medium; communication device; and with manual input device; with an optical output device; and with at least one acoustic output device. Optionally, acoustic input device or external communication devices with an integrated acoustic input are provided that communicates via the Internet with a goods processing apparatus, in particular a franking machine.

If a print medium is discussed in the following, other print media such as flat goods, mail pieces, letter envelopes, postcards and the like should not thereby be precluded from being processed in a printing goods processing apparatus, as for example, a franking machine, which has the claimed inventive features.

An object of the present disclosure is to provide a goods processing apparatus that is suitable for acoustic communication. The input and output interfaces of a goods processing apparatus may be supplemented at least by acoustic one or more output devices or interfaces that are configured to reproduce audio or sound files, and smart features to facilitate the operation of the device. The security in the communication of the goods processing apparatus with at least one remote server can be increased, and the operating security of the goods processing apparatus can be increased via security measures.

A goods processing apparatus according to an exemplary embodiment is a PostBase®-type franking machine. In an exemplary embodiment, the goods processing apparatus includes a controller, a security module and a first communication interface to securely communicate with at least the server of the manufacturer of the goods processing apparatus, an acoustic output device to configured to output audio or sound files. The server may be remote from the installation site of the goods processing apparatus, but is not limited thereto. The acoustic output device may include at least one electro-acoustic transducer and an associated amplifier. They are electrically connected with the controller. A program memory of the controller contains a program for controlling the acoustic output, wherein the program is designed so that external commands may be transmitted from the remote server of the manufacturer of the goods processing apparatus, or from other sources (service provider A-Z) of the Internet, to the controller. Security measures are configured to prevent the operating security of the goods processing apparatus from being affected or that harmful code is transmitted. The security module and the first interface are electrically connected with the controller and, via cryptographic operations, enable a secure communication with at least the remote server of the manufacturer of the goods processing apparatus. The security module contains both private and public stored keys that cannot be read out by unauthorized parties. The operating security of the goods processing apparatus may be increased via security measures, such as encrypted data transfer between a mainboard of the goods processing apparatus and the remote server. Furthermore, a signing of instructions on the server side in combination with a user identification (user ID) and with a time stamp (time code) and/or a review of a TLS certificate (Transport Layer Security) may be performed by the client.

In an exemplary embodiment, the acoustic input device can include an analog signal preamplifier and an analog-to-digital (A/D) converter. The A/D converter is electrically connected with a central processing unit (CPU) of the controller of the franking machine. The program memory of the controller may include a program for controlling the acoustic input. The program memory may also contain a stored program with a speech assistant, wherein the latter interacts with the acoustic input device in order to enable the operation of the goods processing apparatus via a speech control. An internal and/or external microphone, or a headset, may be used as an acoustic input device. A connection socket of the goods processing apparatus is provided for an external microphone or headset. The internal microphone may be arranged on a mainboard, or alternatively at a suitable location under the housing of the goods processing apparatus, if structure borne sound damping devices or mechanisms are used. The mainboard of the controller of the goods processing apparatus contains an A/D converter that is electrically connected with the controller. The CPU of the controller preferably contains an internal A/D converter that is electrically connected with the internal or external microphone via a signal preamplifier.

In an exemplary embodiment, the goods processing apparatus is a franking machine. With smart features, a smart franking machine may adapt even better to the individual needs of the user. In an exemplary embodiment, the good processing apparatus is a PostBase®-type franking machine that is equipped with additional acoustic devices (e.g. electro-acoustic transducer(s)) configured to enable improved communication with the user. The software of the franking machine is equipped with a program for speech output. Speech assistants, for example Ski, Alexa, or others, may additionally improve the acoustic communication. The speech assistants are supported by apps which are further developed or updated via updates so that acoustic inputs are specifically supported.

In an exemplary embodiment, the goods processing apparatus includes at least one acoustic output device that is electrically connected with the controller. In an exemplary embodiment, the acoustic input device is provided in an external communication device, where the acoustic input device includes at least one additional microphone. A program stored in the program memory of the goods processing apparatus is designed so that a speech input via the external communication device leads to a command output to the controller of the goods processing apparatus or of the franking machine and/or to an acoustic output device. A remote server of the franking machine manufacturer and a first communication connection of the remote server with the goods processing apparatus or with a personal computer are provided. The personal computer can be involved in a communicative connection with the goods processing apparatus via a second communication connection.

The external communication device has a third communication connection to an external station of a mobile communication operator, wherein the latter is involved in a communicative connection with an external cloud service via a fourth communication connection and via the Internet. It is provided that the remote server is likewise engaged in a communication connection via the Internet with the external cloud service, such that the remote server may establish the first communication connection to the personal computer if needed, where the remote server has a suitable stored software which allows the commands output by the personal computer to be input into the goods processing apparatus via the one second communication connection in order to trigger an acoustic output or another selected, desired action of said goods processing apparatus.

Figure 4:
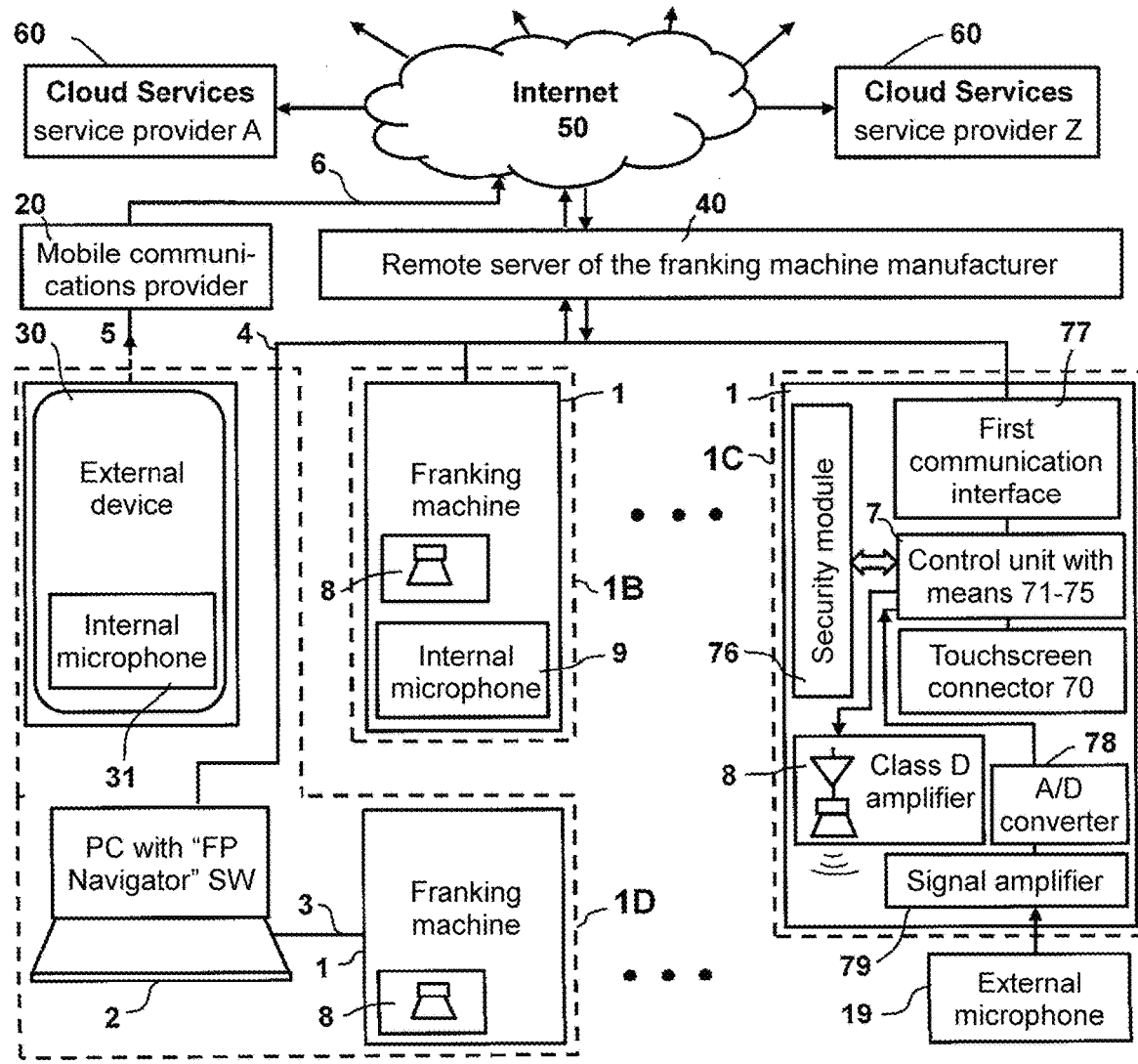
FIG. 4 illustrates simplified block diagrams of acoustic input and output devices according to exemplary embodiments of the present disclosure.

The first communication connection may be realized as a Local Area Network (LAN) (FIG. 4).

Figure 5:
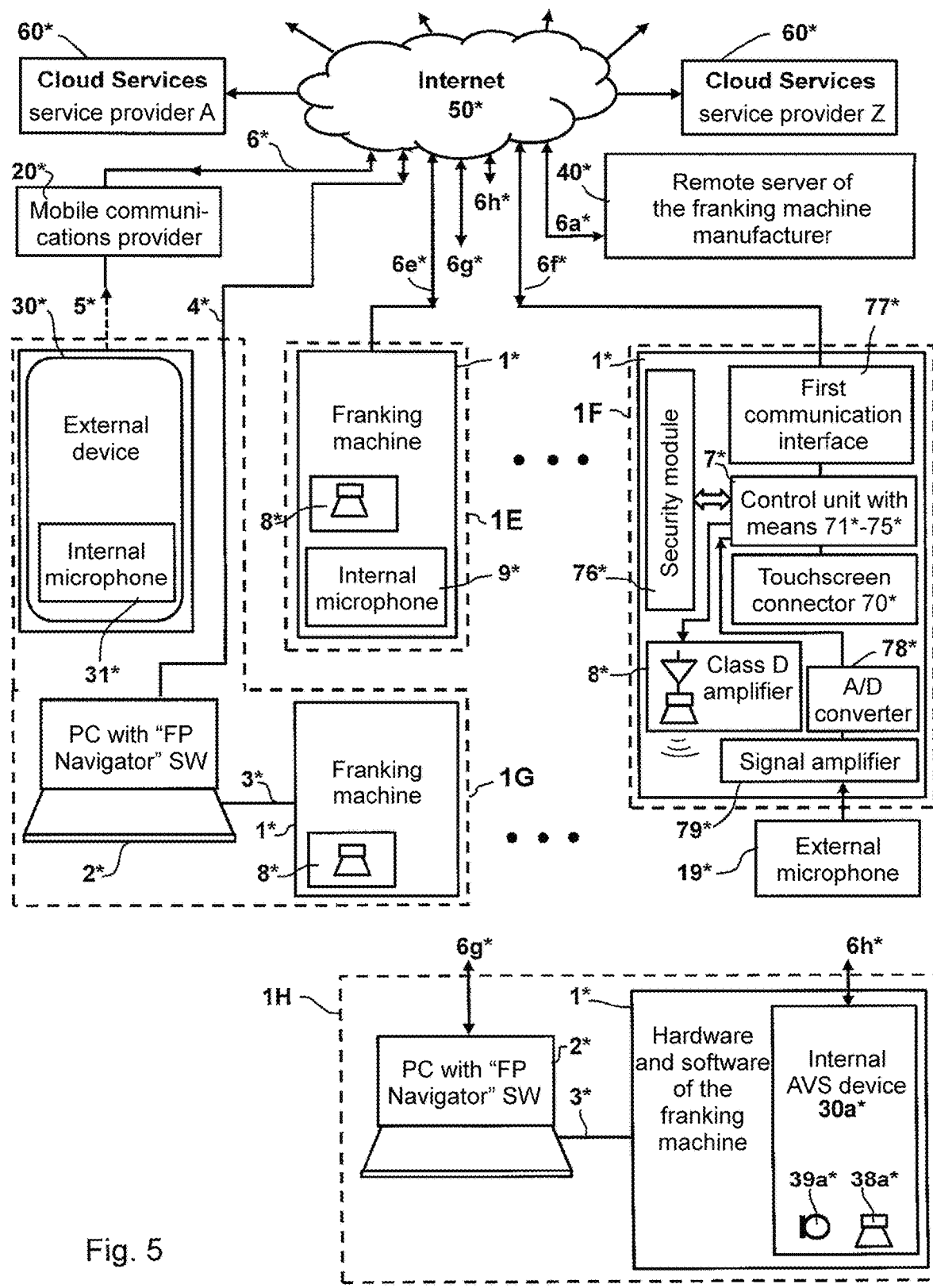
FIG. 5 illustrates a simplified block diagrams of acoustic input and output devices according to exemplary embodiments of the present disclosure.

Alternatively, the remote server of the goods processing apparatus manufacturer or franking machine manufacturer may establish the first communication connection to the personal computer via the Internet if needed (FIG. 5).

In an exemplary embodiment, the at least acoustic output device includes a loudspeaker as an electroacoustic transducer, which is also referred to as an acoustic transducer. In an exemplary embodiment, the goods processing apparatus is designed as a franking machine, for example, where an upper housing shell has a first opening in the top side, and a loudspeaker that is encapsulated is mounted on the underside of the upper housing shell so that a membrane of the mounted loudspeaker emits sound waves through the opening. In an exemplary embodiment, the dimensions of the capsule of the loudspeaker are dimensioned so that an acoustic short circuit at low sound frequencies is avoided so that an approximately linear frequency response is maintained from, for example, 250 Hz to 4 KHz.

In an exemplary embodiment, the software of the franking machine is furnished with a corresponding program for acoustic input and/or output. A software—referred to as a speech assistant—that combines a speech input with a synthesis of natural language responses is used for speech recognition and speech analysis. An intuitive interface is thus achieved between a user and a goods processing apparatus, for example a franking system or a franking machine, so that commands may be generated based on the speech input. In an exemplary embodiment, the franking machine includes processor circuitry that is configured to perform one or more operations and/or functions of the franking machine. For example, the mainboard of the franking machine includes processor circuitry in one or more embodiments.

In a server of the manufacturer of the franking machines, a software is provided in order to filter out those instructions which are based on some of the signal words misunderstood by the speech assistant or that are not plausible. Furthermore, hardware-based and/or software-based configurations for a secure communication of the franking machine with the remote server of the manufacturer are provided. That has the advantage that harmful code cannot be introduced.

In an exemplary embodiment, the controller of the franking machine includes one or more interfaces for the acoustic devices and/or amplifiers that are mounted on the mainboard of the controller. An arrangement of a loudspeaker takes place at a suitable location on the underside of the upper housing shell of the franking machine. Diaphragms in arbitrary colors and of special design are arranged on the top side of the upper housing shell of the franking machine. An acoustic short circuit may be prevented via an encapsulation of the loudspeaker. An arrangement of a microphone may take place on the mainboard or at a suitable location under the housing (for example on the front side), and a speech processing may take place in the franking machine, at a server of the franking machine manufacturer, or at a remote external server (cloud). After a speech processing in the remote external server (cloud), for example of the company Amazon, this sends messages per the REST interface (HTTPS) to the server of the franking machine manufacturer, said messages being based on the preceding speech input. The explanation of REST also arises in principle from the following literature passage:

https://en.wikipedia.org/wiki/Representational_state_transfer

A transfer protocol from a library of functionalities is used in the communication between a server of the franking machine manufacturer and the franking machine, for example. In an exemplary embodiment, the library is the 'SignalR' library (e.g. see https://en.wikipedia.org/wiki/SignalR).

SignalR is a library which enables web servers to be extended with a real-time functionality in that it allows them to push messages to connected clients. SignalR typically uses WebSockets for this. The server-side messages are therefore sent via an additionally opened transmission control protocol channel (Transmission Control Protocol=TCP). The identification of the computer participating in the network occurs via IP addresses.

As an alternative to SignalR, a different technology that supports WebSockets may also be used. A framework from Microsoft for servers that communicate via the World Wide Web is referred to in the following as ASP (Application Service Provider). A new library for ASP.NET developers that simplifies the development of web functions in real time is called ASP.NET SignalR. SignalR enables bidirectional communication between server and client. Servers may now send contents immediately to connected clients as soon as they are available. SignalR supports WebSockets and makes use of other compatible technologies for older browsers. SignalR contains APIs for the connection administration (for example linking and separating events), grouping of connections, and authorization. The API (Application Programming Interface) is an application programming interface that is provided by a software system to other programs for linking to the system.

FIG. 1A shows a perspective depiction of an upper housing shell of a franking machine according to an exemplary embodiment from the upper right front. A print medium, for example a piece of mail, may be transported through the franking machine in the transport direction x.

The directions y and z are situated orthogonal to this transport direction x according to a Cartesian coordinate system.

The upper housing shell 10 has to the left a side wall 11 situated upstream, and to the right a side wall 12 situated downstream, as well as a front wall 13 at the front and a rear wall 14 to the rear. The top side 15 of the upper housing shell 10 is curved and has support ribs 156, 157, 158 and 159 for a housing panel (not shown) in the rear half of the top side 15. The top side 15 of the upper housing shell 10 has a first segment 151, situated upstream, between the support ribs 156, 157 in the rear half of the upper housing shell 10. In the center of the first segment 151, a first opening 1510 for a loudspeaker is formed, which loudspeaker is installed on the underside of the upper housing shell 10 and whose membrane dimensions align with the first opening 1510. In a second segment 152, a second opening 1520 for a plug connector socket for a loudspeaker cable for electrical connection of the loudspeaker to a mainboard of the franking machine is formed (FIG. 1B—Detail A) between the support ribs 157, 158 in the rear half of the upper housing shell 10, wherein the connection is made after an installation of the upper housing shell 10 on a lower housing shell (not shown). In a third segment 153 situated downstream, a third opening 1530 for an installation of a static weighing plate (not shown) is provided between the support ribs 158, 159 in the rear half of the upper housing shell 10. The front half of the top side 15 is comprised of an approximately square fourth segment 154, situated downstream, and an approximately square fifth segment 155, situated upstream. Installed below the approximately square fifth segment 155 of the top side 15, said fifth segment being situated upstream, is an input/output (I/O) device 16 configured to accept a manual input and provide an optical display. In an exemplary embodiment, the I/O device 16 is a touchscreen display. The display can protrude upward in the z-direction through an opening 1550. An additional opening 1540 for an ink cartridge exchange is provided in the likewise approximately square fourth segment 154 of the top side 15, said fourth segment being situated downstream. The upper housing shell 10 and a lower housing shell (not shown) are determinative for a total volume of approximately 20-30 liters, which includes the housing, wherein a height of the housing is smaller than the remaining dimensions, and the remaining dimensions of the housing are realized so as to be of equal size. Although installations within the housing may be provided, the volume of a capsule which encapsulates the loudspeaker and is installed on the underside of the upper housing shell may be realized large enough so that an acoustic short circuit at low sound frequencies is avoided and an intelligible speech reproduction is enabled.

Alternatively, an arrangement of the encapsulated loudspeaker at a different suitable location under the upper housing shell is possible.

Figure 2:
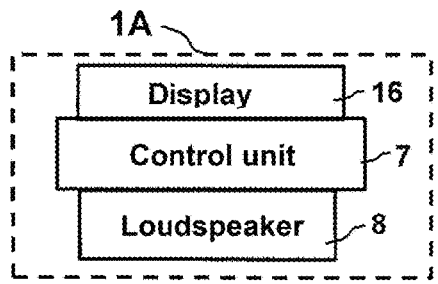
FIG. 2 illustrates a simplified block diagram of a circuit arrangement of an acoustic output device according to an exemplary embodiment of a goods processing apparatus.

A simplified block diagram of a circuit arrangement 1A for acoustic output according to an exemplary embodiment is described with reference to FIG. 2. In an exemplary embodiment, goods processing apparatus, for example a PostBase®-type franking machine, includes an acoustic output device 8 (e.g. speaker) configured to output acoustic signals. In an exemplary embodiment, the acoustic output device 8 is controlled by controller 7 and includes at least one loudspeaker. As well, the controller 7 may control a connector 70 for the touchscreen display 16 (FIG. 1A).

Figure 3:
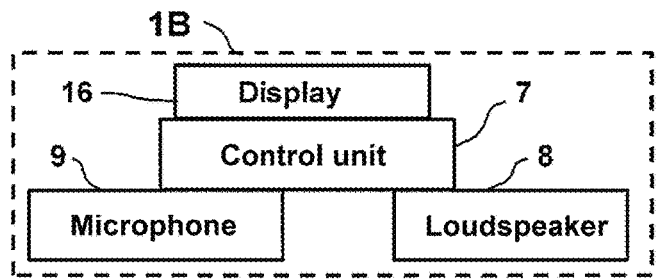
FIG. 3 illustrates a simplified block diagram of a circuit arrangement of acoustic input and output devices according to an exemplary embodiment of a goods processing apparatus.

FIG. 3 illustrates a simplified block diagram of a circuit arrangement 1B for acoustic input and output according to an exemplary embodiment of the present disclosure. A goods processing apparatus according to an exemplary embodiment, for example a PostBase®-type franking machine, includes an acoustic output device 8 (e.g. speaker) configured to output acoustic signals and an acoustic input device 9 (e.g. microphone) configured to receive/accept acoustic signals. In an exemplary embodiment, the devices 8 and 9 are controlled by a controller 7 and have at least one loudspeaker and one microphone, respectively. The controller 7 may likewise control a connector 70 (FIG. 4) for the touchscreen display 16 (FIG. 1A). The volume for the acoustic reproduction of speech and audio signals may advantageously also be adjusted via the touchscreen display.

FIG. 4 shows simplified block diagrams for acoustic input and output devices according to exemplary embodiments of the present disclosure, including configurations 1B, 1C, and 1D.

A goods processing apparatus according to embodiment 1B, for example, a PostBase®-type franking machine, includes devices 8 and 9 for acoustic output/input of acoustic signals. The devices 8 and 9 for acoustic output/input have at least one speaker and (e.g. internal) microphone, and are controlled by the controller 7.

A goods processing apparatus according to configuration 1C, for example a PostBase®-type franking machine, includes an acoustic input device, such as an analog signal preamplifier 79 for a microphone and an A/D converter 78 that is connected with the controller 7. The acoustic input device may be controlled by the controller 7 and have (the manner is not shown) either a plug connector for connection of an external microphone 19 or a headset (not shown). In an exemplary embodiment, the mainboard 1 has a touchscreen display connector 70 and acoustic output device 8 configured to output acoustic signals, such as a Class D amplifier for at least one loudspeaker. The mainboard 1 may also have (the manner is not shown) a communication device that is configured to wirelessly communicate with a headset.

In an exemplary embodiment, the controller 7, arranged on a mainboard 1 of a franking machine, includes a central processor unit (CPU) 71; a program memory (ROM) 72; a working memory (RAM) 73; an input/output circuit 74, for example a Field Programmable Gate Array (FPGA); a non-volatile memory (NVM) 75, a security module 76; and a first communication interface 77 configured to communicatively couple to a remote server 40 of the manufacturer of the franking machines via network 4. The first communication interface 77 includes at least one communication device configured for wired communications (e.g. via a local area network (LAN)) and/or wireless communications (e.g. via a wireless local area network (WLAN)). The communication interface 77 is a wired and/or wireless transceiver in one or more embodiments. The network 4 may be a LAN, WLAN, or a combination of both, for example. The network 4 includes a communication channel which is secured via varying session keys.

The remote server 40 of the manufacturer is engaged via the Internet 50 in a communication connection with the cloud services 60 of the service provider companies A through Z.

A CPU of the controller 7 and a switching amplifier, in particular a Class D amplifier, are installed on the mainboard 1. The switching amplifier is associated with acoustic output device 8 and is configured to amplify pulse width-modulated signals at the output of the CPU of the controller 7. The CPU uses a pulse width modulation to generate an approximately sinusoidal curve of the short term mean value of the voltage. At the output device 8 (e.g. loudspeaker), this voltage curve acts like a sine voltage. The pulses of different length in the pulse width modulation are amplified by driver transistors and switched on and off at a high frequency (e.g. 90-100 kHz). A high efficiency of approximately 90% is thereby achieved. Before it is relayed to the loudspeaker for the purpose of sound conversion, the switched output signal is additionally filtered with a low-pass (not shown) in order to suppress electromagnetic interference due to the RF switching frequency, which might affect other devices. The mainboard 1 includes suitable additional interfaces (not shown) for acoustic input and output devices (microphone and loudspeaker). According to embodiment 1B, an arrangement of at least one microphone 9 on the mainboard 1 is provided, or alternatively at a suitable location under the housing (for example on the front side). However, measures for active and/or passive vibration damping may be taken in order to largely suppress the influence of the structure-borne sound on the speech analysis.

According to configurations 1C and 1D, an external microphone 19 is provided to exclude the influence of structure-borne sound. In an exemplary embodiment, a franking machine according to configurations 1D includes a microphone which is integrated into an external device 30, for example a mobile telephone, that may enter into a communicative connection with a mobile communications provider via a communication protocol, such as, for example, the Global System for Mobile Communications (GSM) or Universal Mobile Telecommunications System (UMTS) or Long Term Evolution (LTE) etc. as a third communication connection 5.

The mobile communications provider is engaged in a communicative connection with a cloud services 60 of one of the service provider companies A through Z via a network, for example a fiber optic network etc., as a fourth communication connection 6, and via the Internet 50.

FIG. 5 shows simplified block diagrams of acoustic input and output devices according to exemplary embodiments including configurations 1E, 1F, 1G, and 1H.

A goods processing apparatus according to exemplary embodiment 1E, for example a PostBase®-type franking machine, acoustic output device 8* and acoustic input device 9* that—as shown in FIG. 3—are likewise controlled by a controller (e.g. controller 7*) and have at least one loudspeaker and an internal microphone, respectively. The Internet 50* is engaged in a communicative connection with a remote server 40* of the manufacturer of the goods processing apparatus, in particular of franking machines, via a fifth communication connection 6a*. The controller of the goods processing apparatus according to embodiment 1E is arranged on a mainboard 1* and is engaged in communicative connection with the Internet 50* via a sixth communication connection 6e*. On the one hand, the server 40* and the controller (e.g. on mainboard 1*) of the goods processing apparatus communicate with one another via the Internet 50*. On the other hand, the server 40* of the manufacturer and the cloud services 60* communicate with one another via the Internet 50*.

A controller arranged on a mainboard 1* of the goods processing apparatus according to exemplary embodiment 1F has a first communication interface 77* and is engaged in a communicative connection with the Internet 50* via a seventh communication connection 6f*. The communication interface 77* is a wired and/or wireless transceiver in one or more embodiments. The remote server 40* of the manufacturer is engaged in a communication connection with the Internet 50* via the fifth communication connection 6a*, in order to communicate on the one hand with the controller of the goods processing apparatus according to variant 1F and on the other hand with a cloud service 60* of the service provider companies A through Z. The goods processing apparatus according to embodiment 1F includes an acoustic input device, such as an analog signal preamplifier 79* for an external microphone 19* and an A/D converter 78* that is connected with the controller 7*. Instead of (or in addition to) the microphone 19*, a headset or another suitable speech set may alternatively be connected via a connection socket (USB socket) or wirelessly via Bluetooth, WLAN, or DECT (the manner is not shown). The Universal Serial Bus (USB) is a serial interface to the mainboard 1* that may transfer digital and analog audio signals and be controlled by the controller 7*. The controller 7* has a touchscreen display connector 70* and acoustic output device 8* for acoustic output, such as a Class D amplifier for at least one loudspeaker. A wireless communication device for wireless data transfer via Bluetooth, WLAN, or Digital Enhanced Cordless Telecommunications (DECT) to a wireless headset are provided on the mainboard 1*. The controller 7* includes a central processor unit (CPU) 71*; a program memory (ROM) 72*; a working memory (RAM) 73*; an input/output circuit 74*, for example a Field Programmable Gate Array (FPGA); a non-volatile memory (NVM) 75*; a security module 76*; and a first communication interface 77* for communicative connection 6e* via the Internet 50* with a remote external server 40* of the manufacturer of the goods processing apparatuses. In an exemplary embodiment, the controller 7, 7* includes processor circuitry that is configured to perform one or more operations and/or functions of the controller 7, 7*.

A goods processing apparatus according to embodiment 1F (FIG. 5) differs from a goods processing apparatus according to variant 1C (FIG. 4) with LAN in that it is engaged in a communicative connection with the Internet 50* via a seventh communication connection 6f*.

A goods processing apparatus according to embodiment 1G (FIG. 5) differs from a goods processing apparatus according to embodiment 1D (FIG. 4) in that the PC with a software "FP-Navigator" is engaged in a communicative connection with the Internet 50* via the first communication connection 4*. The client (in this instance the FP-Navigator) checks the TLS certificate of the server (server of the franking machine manufacturer) and therewith ensures that it is actually the correct server. The "FP-Navigator" software enables it to operate the franking machine directly from the PC screen. The speech assistant Ski has already enriched our daily lives for markedly longer than its competitors from Amazon, Google, and co. The instructions and/or the responses contained in the transmitted audio files can be checked for plausibility, which assumes that corresponding algorithms are implemented in the remote server of the manufacturer of the goods processing apparatus, in particular of the franking machine manufacturer, and that the audio files transmitted by Ski are transmitted directly to the remote server of the manufacturer. Alternatively, a plausibility check may also be performed by a software installed at the PC 2*.

A goods processing apparatus according to embodiment 1H (FIG. 5) differs from a goods processing apparatus according to embodiment 1G (FIG. 4) in that both the PC and the goods processing apparatus are respectively separately connected to the Internet. The PC 2* has a second interface and an eighth communication connection 6g* to the remote server 40* via the Internet 50*. The goods processing apparatus is preferably a franking machine with corresponding hardware and software which are realized on a mainboard 1*. An internal AVS device 30*a** with a loudspeaker 38*a and a microphone 39*a is mounted on the mainboard. An associated AVS software module is likewise installed. The Alexa Voice Service (AVS) in principle sends the speech responses (Response) only to the source of the request message (thus the device which implements the AVS interface, for example the Echo-type smart speaker from Amazon. An internal AVS device is mounted on the mainboard 1* so that a franking machine without speech assistant may nevertheless acoustically reproduce speech files. A ninth communication connection 6*h via Internet 50* is required between the mainboard 1* and a cloud service A. Furthermore, a second communication connection 3* exists between the PC 2*** and the franking machine.

No communication connection with a PC is provided in the goods processing apparatus, in particular a franking machine, according to embodiment 1E (FIG. 5). Nevertheless, the franking machine may, for example, have an AVS functionality (including the audio input and output, among other things) in the program code of the franking machine, whereas according to variant 1H (FIG. 5) the AVS functionality must be implemented in an internal AVS device additionally installed in the housing. In the instance of the Alexa speech assistant, the device must necessarily both send the request to the Alexa service and receive the corresponding response via the first interface. After the response has been received, in an additional embodiment (not shown), the audio data contained in the response may be sent, for example via Bluetooth, to a corresponding headset (and also in order to use the input of the microphone as a basis for the request), and/or output directly with a loudspeaker at the device.

Figure 6:
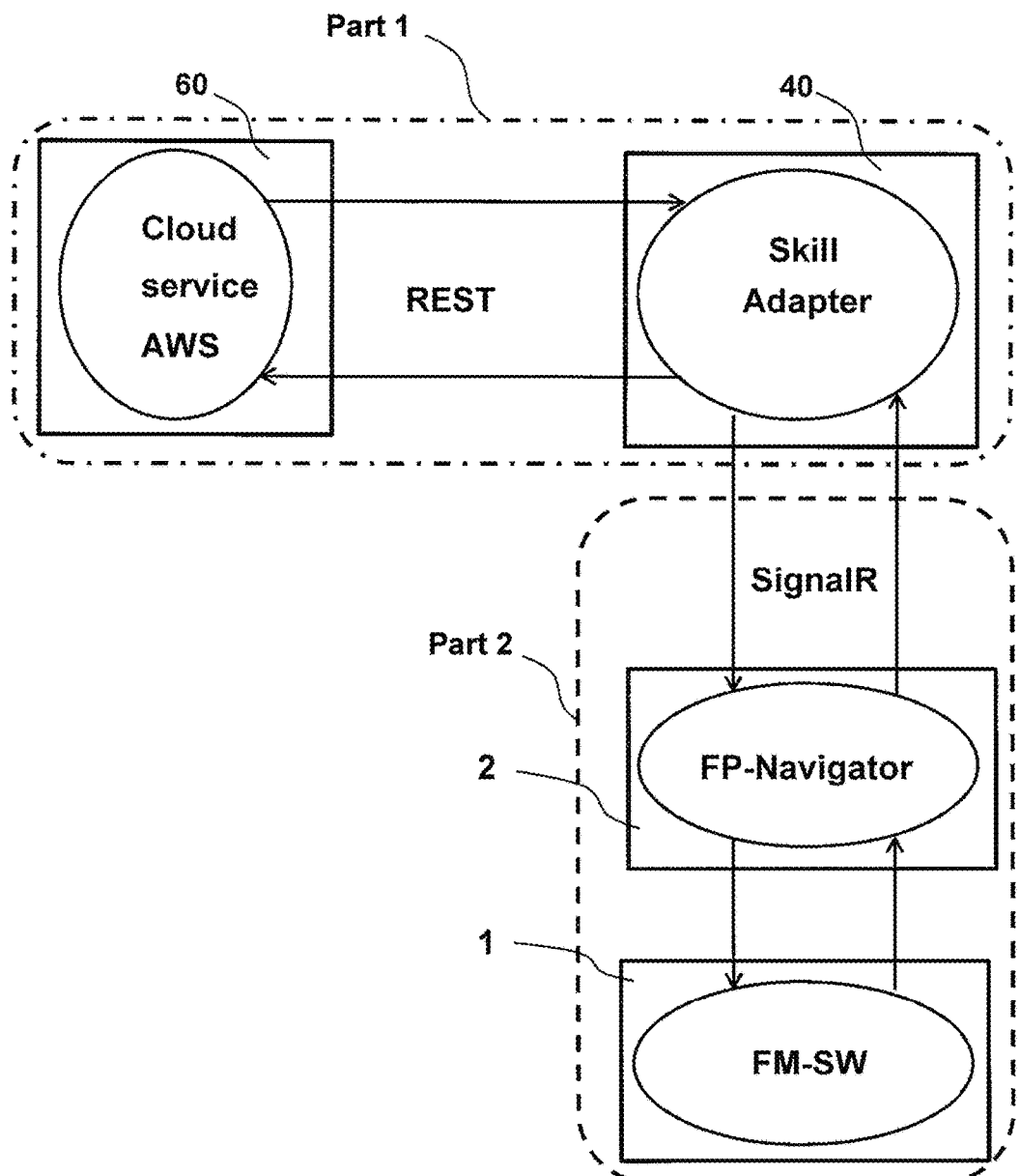
FIG. 6 is an illustration of communication connections according to an exemplary embodiment of the present disclosure.

The communication connections according to an exemplary embodiment are presented in simplified form in FIG. 6. A first part of a communication occurs between the server 60 of a cloud service and the server 40 of a manufacturer of the franking machines. A second part of the communication occurs between the server 40 of the manufacturer and a personal computer 2 of a user, which is engaged in a communicative connection with a franking machine 1.

The server 60 of a cloud service of the US computing vendor AWS (Amazon Web Services), a subsidiary company of the online mail-order business Amazon, has offered numerous services since the year 2006. For example, an "Alexa" cloud service is provided by the service provider company Alexa. An implementation of the Alexa connection can be subdivided into a first part and a second part. In the first part of the communication between the server of the cloud service 60 and the server 40 of the franking machine manufacturer, the REST interface defined by Amazon is used. In the second part of the communication between a skill adapter on the server 40 of the manufacturer and the PC software of a personal computer 2 of a user, instructions are sent from the server 40 to the PC software via a push method, with the aid of WebSockets. The PC software is referred to as FP-Navigator in the following and is provided for franking machines.

A "SignalR" library which is based on WebSockets forms an interface between the two parts. The first part includes the "Alexa" cloud service, a Representational State Transfer (REST) architectural, a Skill Adapter, and the "SignalR" library.

The speech control of the franking machine using Amazon Alexa is realized as what is known as a skill. From the viewpoint of the user, a skill is comparable to a smartphone app. In contrast to the app, however, the skill is not installed at the device of the end user but rather is merely added to his (virtual) user account, and therefore is considered in the interpretation of his speech inputs. Amazon enables a series of different skill types which arise from:

https://developer.amazon.com/docs/ask-overviews/understanding-the-different-types-of-skills.html The types of skills are:

Custom Skills

Smart Home Skills

Flash Briefing Skills

Video Skills

List Skills

Only the Custom Skill offers the necessary flexibility for the realization of speech control. From the developer's point of view, a Custom Skill is in principle composed of the following components:

Intents

Sample Utterances

Skill adapter

The aforementioned components arise at least in part from:

https://developer.amazon.com/docs/custom-skills/understanding-custom-skills.html #components-of-a-custom-skill The intents are types of instructions of the skill. They arise from Table 1:

TABLE 1

| | |
|---|---|
| PingDevice | Test the connection from the Skill Adapter to the FP-Navigator |
| ConnectToDevice | Establish a logical connection between FP-Navigator and the franking machine |
| DisconnectFromDevice | End the existing connection between navigator software and franking machine |
| ImprintLabels | Print one or more labels placed in the franking machine with a franking imprint |
| ImprintLetters | Print one or more letter envelopes placed in the franking machine or a connected automatic supply device |
| CancelPrintingInProgress | Terminate a running print process |
| SetWeight | Set the letter weight for which the following labels should be printed |
| SelectAdvertisementImage | Select the advertisement plate to be used |
| SelectAdvertisementText | Select the advertisement text to be used |
| RemoveAdvertisement | Deselect the currently used advertisement |
| SelectCostAccount | Select the cost center to be used |
| SelectShortcut | Select a previously created printing profile |
| SetDeviceMode | Change the operating mode of the franking machine. Default, SealOnly, FeedOnly, PrintNumbers, and AdvertTextOnly are available for selection. |
| ChargeCredit | Charge the credit account currently available at the machine |
| DisplayLastBookings | Display the last bookings, optionally filtered according to specific criteria (the last n bookings or all bookings from the indicated time interval) |
| PrintDeutschePostDeliveryList | Print the delivery list for Deutsche Post |
| PrintPackingList | Print the packing list |

Example statements, including information as to which Intents these should be mapped to and how associated slots should be filled, are referred to as Sample Utterances. A few Examples here:

"Show me all bookings between {FirstIncludedDate} {LastIncludedDate}"

results in an IntentRequest with the "DisplayLastBookings" Intent with the parameters "FirstIncludedDate" and "LastIncludedDate", respectively of the data type AMAZON.DATE By contrast, "Display with the last {NumberOfBookingsToDisplay} bookings"

leads to a "DisplayLastBookings"-type Intent with the parameter of "NumberOfBookingsToDisplay" of the data type AMAZON.NUMBER "Print all envelopes in the automatic feed"

leads to a parameter-less Intent of the "ImprintLetters" type.

"Select advertisement {AdvertisementNumber} on the {AdvertisementPosition} side"

leads to the Intent of "SelectAdvertisementImage" with the parameter of "AdvertisementNumber" of the AMAZON.NUMBER-type, and the parameter of "AdvertisementPosition" of the Custom-type advertisement position. The Skill Adapter is an interface between the Amazon services and the franking machines of FP.

The skill adapter runs at the server 40 or 40\* and has essentially the following tasks:

Accept connection requests from FP-Navigator instances or franking machine instances, and establish a bidirectional TCP connection using SignalR and WebSockets. The Transmission Control Protocol (TCP) is a transmission control protocol of the bidirectional connection.

Provide a REST interface that satisfies the Alexa Service API. The end point receives requests per http POST and, by using the information delivered therewith, checks whether the sender is authorized to use this. Only the Alexa service is authorized for the associated Skill(s).

Map the contents of the Alexa requests to corresponding device functions, including associated parameters.

Relay the determined instructions via push methods to the corresponding FP-Navigator that can be reached via a bidirectional connection. Instructions may hereby be relayed to the devices immediately—thus without delay—and are not dependent on these devices being independently queried at defined intervals.

Provide a feedback channel for status messages about success or occurring errors (for example, that an instruction could be successfully relayed to the franking machine, or that the franking machine does not have sufficient credit to print the letters).

Map the occurred status messages to the matching natural language response, depending on the language of the user as indicated in the request.

Generate a matching response message, including the natural language response text generated using the feedback of the FP-Navigator (the format of this response must likewise satisfy the Amazon API, of course).

A Uniform Resource Locator (URL) is a uniform resource pointer that identifies and locates a resource, for example a web site, via the access method to be used (for example the network protocol to be used, such as HTTP) and the location of the resource in computer networks.

A URL of the skill adapter is stored at Amazon in the skill configuration (via a Web interface) as a "Service Endpoint" of the skill. All requests belonging to this skill (LaunchRequests, IntentRequests and SessionEndedRequests) are hereby sent to this server. The task of the skill adapter is now to read out this Alexa request, map it to the respective command that is actually to be executed by the franking machine, and relay it to the matching navigator software. Depending on the result, the navigator software responds with a matching status message, thus for example "WeightSet" or "NotEnoughCredit", whereupon the skill adapter selects a matching response text and sends this, in addition to other information, to the Alexa cloud as a skill response, likewise via a REST interface. An audio file is then generated from this response text and played back after it has been sent to the corresponding AVS device (for example an Amazon Echo). The format of the skill requests and responses is defined by Amazon in the Service Interface.

Figure 7:
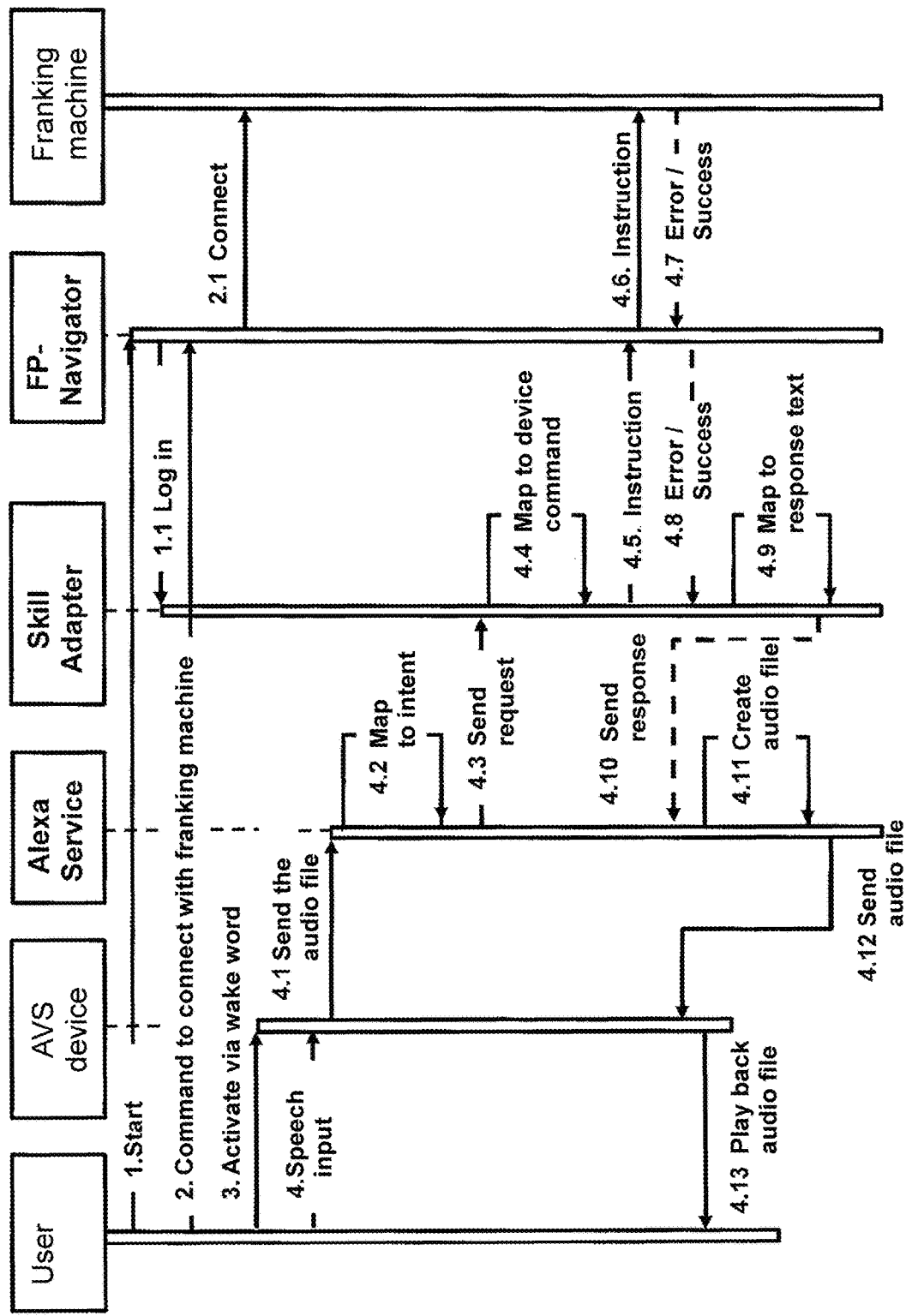
FIG. 7 illustrates a sequence protocol according to an exemplary embodiment of the present disclosure.

FIG. 7 illustrates a workflow according to an exemplary embodiment, and includes:

1. Start the FP-Navigator,
1.1 Log in to the skill adapter using FP-Navigator,
2. Command the user to connect the FP-Navigator to the franking machine. The user interacts with the franking machine via FP-Navigator, or alternatively directly (the manner is not shown).
2.1 Connect the FP-Navigator to the franking machine,
3. Activate the AVS device via the wake word. A device that satisfies the AVS specification (for example a mobile telephone or a device from the Amazon Echo line) is activated in order to enable a speech input. In the instance of Amazon Alexa, this occurs via the use of what is known as a wake word, "Alexa". Alternatively, the franking machine equipped with acoustic input and output devices may also be an AVS device (the manner is not shown).
4. The user begins with the speech input of the command. The basic structure of the command (to delegate the actual, contained command to the analysis according to a scheme defined by the skill developer) follows a template provided by Amazon. For example, this may occur by appending "to [name of the skill]". A complete command might then read as follows: "Print ten letters, to PostBase".
4.1. The audio recording of this command is stored in an audio file and sent by the AVS device to the Alexa service for additional processing. This service may (after a transcription of the audio file into a text) detect, using the structure of the command—thus for example using the ending "to Post-Base"—that this command is intended for the custom skill "PostBase" (previously added by the user to his profile). The service will now analyze the remainder of the command using the Sample Utterances stored with regard to this skill.
4.2. Given a mapping to intent, the command is mapped to the respective matching intent as well as its parameters. The text from the example, "Print ten letters," would thus be mapped to the intent "ImprintLetters" with the parameter "NumberOfLettersToImprint" of "10". The information about the determined intent is combined with other information such as the ID of the skill and information about the user, the session, etc., to form a request in the JSON format.
4.3. A request is sent to the skill adapter. The information is sent via transport-encrypted https to the address of the skill adapter (likewise stored in the configuration of the skill), for example in the body of an http POST request.
4.4. Mapping to the device command. The requests sent by the Amazon Alexa Service may be processed by the skill adapter, since the skill adapter satisfies the API specification. Initially, a check is performed using the application ID as to whether the source of the message actually corresponds to the speech service and also belongs to an authorized skill. If the check is successful, the intent, including associated parameters, is extracted from the message and mapped to the matching device command.

4.5. The Internet, including associated parameters, are sent to the FP-Navigator belonging to the user. In the example, the instruction to print 10 letters is thus passed to the PC software. The previously established bidirectional TCP connection (opened per SignalR) is used as a transmission channel.

4.6. An instruction is now transmitted from the FP-Navigator to the franking machine. This may either proceed successfully or a specific error occurs.

4.7. This success or error (failure) is transmitted from the franking machine to the FP-Navigator.

4.8. This success or error (failure) is then transmitted as a status code to the skill adapter per TCP.

4.9. Mapping to response text. The skill adapter waits a fixed amount of time for a return response of the FP-Navigator. If no response arrives within this time, it is assumed that the connection has been interrupted and a corresponding error is established. Otherwise, the success of the action is determined using the return response of the FP-Navigator. In any event, a matching response message for the Alexa service is thereupon generated. A text is selected using the success or error message.

4.10. Send response.

4.11. The Alexa service synthesizes a corresponding audio file from the response text that has been delivered concurrently.

4.12. The response and audio file are then transmitted to the AVS device as an http response.

4.13. The franking machine has an internal AVS device which plays back the audio file and acoustically outputs the message to the user.

With the Alexa Voice Service (AVS), developers of networked products may be equipped with an intelligent speech control. AVS is modular in design and abstracted, and offers components for the processing of discrete functions such as speech recording, audio processing, and communication, wherein each component provides at least one Application Programming Interface (API) that may be used and adapted for each integration.

The second part II, the communication (FIG. 6), comprises the "SignalR" library and API of the franking machine. The API is part of the "FP-Navigator" software that runs at the personal computer (PC) 2. A SignalR client was implemented in the "FP-Navigator", which connects with the SignalR server of the first part with or without authentication. The log-in preferably occurs automatically upon starting the FP-Navigator. The client receives messages at the interface. In the following example, 17 implemented message types are explained. After receiving a message, the client executes a few standard functions. A check is thereby made as to whether speech commands may currently be received, and the user is notified if a speech command is input via SignalR. For example, the user then sees an icon blinking on the screen.

Depending on message types, different functions in the FP-Navigator are called which would otherwise be activated by user inputs at the screen. These functions that are already implemented in FP-Navigator additionally enable the communication with the franking machine. For example, simple messages enable the establishment of a connection to the franking machine. Separating the connection between the franking machine and the FP-Navigator is also possible with a command. The messages for selecting short codes/hotkeys or cost centers respectively contain an identifier (ID).

An identifier is a feature, linked with a specific identity, for unique identification of the object. For example, an ID indicates the index of the short code, a cost center, or a name for which a matching short code or cost center is sought. Since small errors may occur in speech recognition or in names, the Levenshtein distance is utilized in order to find a short code or cost center with a name that is as close as possible to the detected word. The Levenshtein distance (also called the edit distance) between two character strings is the minimum number of insertion, deletion, and replacement operations in order to convert the first character string into the second.

The placement of advertisement images and advertisement texts requires an ID/index and a position for placement. This position is machine-dependent. The standard position is to the left. If the right position has been specified and the position is available, the advertisement image or the advertisement text is placed to the right.

Upon removal of advertisement images and advertisement texts, only the position is specified. A removal is then again performed at the left position by default. If the right position is provided and available, removal takes place on the right.

The setting of weights (weight of the letter without weighing) is possible with both metric and imperial units. The conversions of "1500 grams" into "1 kilogram 500 grams" take place automatically.

The reloading of funds into the franking machine is also possible. A default credit reloading (PVD) is hereby executed in the franking machine. The user must confirm the input at the screen of the computer, without speech control. The franking machine has implemented diverse response modes which may now be selected via "Alexa". Among these modes are on the one hand the standard mode, which the machine is normally in; a counting mode in which the letters are numbered for printing; a transport mode in which letters are only counted without a printing being triggered; a sealing mode in which letters are only sealed; and an advertising mode in which only advertisement images or advertisement texts are printed onto the letters. To seal the letters, a separate module is required which, for example, is a component of an automatic feed station (feeder) that is arranged before the franking machine in the transport path. The franking machine has a magazine with franking strips (labels). The printing of the mail pieces output by the feeder, or of the labels output from the magazine, is also controllable. Upon starting the printing, from which source (feeder or magazine) the mail pieces to be printed should be obtained is specified. In addition to this, a specification of the quantity is possible (1 to "all"). The printing may be terminated with an additional command. Whether letters or labels are printed is insignificant. Another command allows the indication of bookings in the FP-Navigator with specification of an optional start date, an optional end date, a maximum quantity, and a cost center. A display takes place on the screen of the PC, without Alexa.

The bidirectionality of "SignalR" additionally allows a response to the server. The user is thereby informed about whether the speech command has been executed. In addition, a user may conclude from the response whether the correct command has been recognized. Therefore, feedback messages in the form of status codes are sent to the server after the execution of received commands. For example, the following feedback messages are implemented:

0: "General success"

1: "Successfully established connection" (to the franking machine)

2: "Successfully terminated connection" (to the franking machine)
3: "Successfully selected short code" (product short code available and set)
4: "Successfully selected cost center" (cost center available and set)
5: "Successfully placed advertisement image" (advertisement image available and placed at the desired position)
6: "Successfully placed advertisement text" (advertisement text available and placed at the desired position)
7: "Successfully removed advertisement" (advertisement image or advertisement text removed at the desired position)
8: "Weight successfully set" (weight for the product has been set)
9: "Funds successfully loaded" (funds have been successfully loaded at the franking machine)
10: "Letter printing successfully started" (letters from the supply are now being printed)
11: "Label printing successfully started" (labels from the supply are now being printed)
12: "Printing successfully terminated" (any printing processes have been terminated)
13: "Device mode successfully set" (the franking machine now operated in a different mode)
14: "Bookings successfully displayed" (desired list is displayed)
15: "Ping response" (response to a ping from Alexa in order to test connection)
100: "General error"
101: "Connection error" (to the franking machine)
102: "Short code not found" (short code with desired name or index was not found), such as "Cost center not found" (cost center with desired name or index was not found)
103: "Insufficient funds" (the loaded funds are not sufficient for printing)
104: "Insufficient funds—printing terminated" (insufficient funds to continue printing)
105: "Advertisement image not found" (advertisement image with desired index not found)
106: "Advertisement text not found" (advertisement text with desired index not found)
107: "Speech activation temporarily deactivated" (the current state does not allow a speech control).

Via queries, actions such as the confirmation of credit reloading (PVD) are also possible via "Alexa." For example: "Alexa, load 100€ onto the franking machine!"—"ARE YOU SURE?"—"Yes."—"FUNDS LOADED."

Alternatively, other transmission protocols, for example "REST", may also be used instead of the "SignalR" transmission protocols.

The status codes between Alexa and FP-Navigator can be freely selected, and also can be realized in a different form.

If an application with the "Alexa" speech assistant is described here in the exemplary embodiment, other speech assistants (Siri/Cortana/Google Assistant/ . . . ) should not be excluded from use, however.

If it is assumed in an exemplary embodiment that the loudspeaker may be operated with sound frequencies in a frequency range of 250 Hz up to at least 4000 Hz, it should not therewith be precluded that sound frequencies up to 20 KHz are reproduced.

If it is assumed in other exemplary embodiments that all instructions are relayed from the cloud service 60 or 60* to the franking machine or the personal computer (PC) 2 via the remote server 40 or 40*, and further to the franking machine, a malfunction of the franking machine may be avoided via a plausibility check. It is therefore provided that a plausibility check of instructions is performed at the remote server 40 or 40*, at the PC 2, and/or at the franking machine. Via these plausibility checks, misunderstood inputs with fatal effects can be detected in a speech analysis and be blocked automatically or after query to the user.

The disclosure is not limited to the embodiment that is presently explained in detail, since additional different embodiments of the disclosure may obviously be developed or used that—based on the same fundamental concepts of the disclosure—are encompassed by the attached patent claims.

CONCLUSION

The aforementioned description of the specific embodiments will so fully reveal the general nature of the disclosure that others can, by applying knowledge within the skill of the art, readily modify and/or adapt for various applications such specific embodiments, without undue experimentation, and without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processor circuitry" shall be understood to be circuit(s), processor(s), logic, or a combination thereof. A circuit includes an analog circuit, a digital circuit, state machine logic, other structural electronic hardware, or a combination thereof. A processor includes a microprocessor, a digital signal processor (DSP), central processing unit (CPU), application-specific instruction set processor (ASIP), graphics and/or image processor, multi-core processor, or other hardware processor. The processor may be "hard-coded" with instructions to perform corresponding function(s) according to aspects described herein. Alternatively, the processor may access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary embodiments described herein, the memory is any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

REFERENCE LIST x transport direction, x-coordinate
y transversal displacement direction, y-coordinate
z z-coordinate of a Cartesian coordinate system
A detail as shown in FIG. 1A
1A, 1B, 1C, 1D, . . . , 1H variants
1, 1* mainboard
2, 2* personal computer (PC)
3, 3* second communication connection
4, 4* first communication connection
5, 5* third communication connection
50, 50* Internet
6, 6* fourth communication connection
6a* fifth communication connection
6e* sixth communication connection
6f* seventh communication connection
6g* eighth communication connection
6h* ninth communication connection
60, 60* cloud services of various service providers A . . . Z
7 controller
70, 70* connector for the touchscreen display
71, 71* processor (CPU)
72, 72* program memory (ROM)
73, 73* working memory (RAM)
74, 74* input/output circuit (FPGA)
75, 75* non-volatile memory (NVM)
76, 76* security module
77, 77* first communication interface (input/output)
78, 78* A/D converter
79, 79* signal amplifier (analog)
10 upper housing shell
9 sound transducer=acoustic output device
9, 9* internal microphone=acoustic input device
10 housing shell
11, 12 side walls of the housing shell
13, 14 front wall, rear wall of the housing shell
15 top side of the housing shell
151-155 first through fifth segment of the top side 15
1510-1550 first through fifth opening of the top side 15
156, 157, 158, and 159 support ribs on the top side of the housing shell
16 display (touchscreen)=manual I/O optical display
17 plug-in connector socket for a loudspeaker cable
19, 19* external microphone=acoustic input device
20, 20* mobile communications provider
30, 30* external device
30a* internal AVS device
38a* loudspeaker of the internal AVS device
39a* microphone of the internal AVS device
40, 40* remote server of the franking machine manufacturer or of the manufacturer of the goods processing apparatus

The invention claimed is:

1. A franking machine, comprising:
a controller including a program memory;
a security module;
a first communication interface that is configured to implement one or more security measures to, in cooperation with the security module, securely communicate with a remote server to prevent harmful code from being transmitted to the controller or prevent an operational security of the goods processing apparatus from being affected, the security module and the first communication interface are electrically connected with the controller;
an acoustic output device electrically connected with the controller and configured to output audio files or sound files, the acoustic output device including a speaker; and
a housing configured to house the controller, the security module, the first communication interface, and the acoustic output device, the housing including an opening, wherein the speaker is mounted to cooperate with the opening such that a membrane of the mounted speaker is configured to emit sound waves outward through the opening,
wherein the program memory stores a program to control the acoustic output via the acoustic output device, the program being configured to facilitate, using the one or more security measures, external commands being securely transmitted from the remote server, or from one or more other internet sources, to the controller.

2. The franking machine according to claim 1, wherein the controller is arranged on a mainboard and includes a central processing unit (CPU), the mainboard including an acoustic input device configured to receive an acoustic input and that includes an analog signal preamplifier and an analog-to-digital (A/D) converter electrically connected with the CPU of the controller, wherein the program memory of the controller includes a program configured to control the acoustic input device.

3. The franking machine according to claim 1, wherein the program memory includes a program having a speech assistant configured to interact with the acoustic input device to enable the operation of the goods processing apparatus via a speech control, wherein the acoustic input device comprises at least one microphone.

4. The franking machine according to claim 3, wherein the acoustic input device comprises an internal microphone or a connection interface configured to interface with an external microphone.

5. The franking machine according to claim 4, wherein the internal microphone is arranged on a mainboard or at a location under a housing of the goods processing apparatus.

6. The franking machine according to claim 5, wherein the mainboard comprises the controller and the analog-to-digital (A/D) converter electrically connected with the controller.

7. The franking machine according to claim 6, wherein the controller comprises a central processing unit (CPU) having an internal A/D converter that is electrically connected with the internal microphone via a signal preamplifier.

8. The franking machine according to claim 1, wherein:
data and instructions are transmitted between the remote server and a personal computer or the mainboard, via network connection;
the remote server is directly engaged in a communication connection with the controller, or with the controller via the personal computer; and
the operational security of the goods processing apparatus is increased by an encrypted data transmission between the mainboard and the personal computer and/or the remote server.

9. The franking machine according to claim 5, wherein the controller comprises a central processing unit (CPU) having an internal analog-to-digital (A/D) converter that is electrically connected with the external microphone.

10. The franking machine according to claim 1, wherein:
the goods processing apparatus is configured to communicate with an external device having an acoustic input device including at least one microphone,
a program stored in the program memory is configured so that a speech input via the external device generates a command output to the controller and/or the acoustic output device, and
the remote server is configured to communicate with the goods processing apparatus or a personal computer via a first communication connection or with a personal computer, the goods processing apparatus being configured to connect to the personal computer via a second communication connection.

11. The franking machine according to claim 10, wherein:
the external device includes a third communication connection to an external station of a mobile communications provider, the external station being configured to engage a communicative connection with an external cloud service via a fourth communication connection and via the Internet;
the remote server is configured to engage in a communicative connection with the external cloud service via the Internet;
the remote server is configured to establish a first communication connection to the personal computer, the remote server including a software stored therein configured to facilitate commands output by the personal computer to be input into the goods processing apparatus via the second communication connection to trigger an acoustic output or another action of the goods processing apparatus.

12. The franking machine according to claim 1, wherein:
the acoustic output device further comprises a Class D amplifier that is electrically connected with the speaker, and
the housing comprises an upper housing shell that includes the opening in a top side of the upper housing shell, the speaker being mounted on an underside of the upper housing shell such that the membrane of the mounted speaker emits sound waves outward through the opening.

13. The franking machine according to claim 1, wherein:
the housing comprises an upper housing shell and a lower housing shell, dimensions of the upper housing shell and dimensions of the lower housing shell determine a total volume of the housing,
a height of the housing is smaller than other dimensions of the housing, the other dimensions being equal in size; and
the franking machine further comprises a capsule that is mounted on an underside of the upper housing shell that is configured to encapsulate the acoustic output device such that a volume of the capsule is sized such that an acoustic short circuit is avoided at low sound frequencies and a comprehensible speech reproduction is enabled.

14. The franking machine according to claim 13, wherein the acoustic output device is configured to operate with sound frequencies in a frequency range from 250 Hz to at least 4000 Hz.

15. The franking machine according to claim 1, wherein a signing of instructions is performed at the server in combination with a user identification, and with a time stamp and/or a checking of a Transport Layer Security certificate.

16. The franking machine according to claim 1, further comprising a capsule mounted inside the housing that is configured to encapsulate the acoustic output device, the capsule being configured to reduce an acoustic short circuit of the acoustic output device.

17. The franking machine according to claim 16, wherein the capsule is configured to have a volume sized that is adapted to reduce the acoustic short circuit.

18. The franking machine according to claim 1, wherein the acoustic output device further comprises an amplifier that is electrically connected with the speaker.

19. The franking machine according to claim 18, wherein the amplifier is a Class D amplifier.

* * * * *